US008083146B2

(12) United States Patent
Carlson et al.

(10) Patent No.: US 8,083,146 B2
(45) Date of Patent: Dec. 27, 2011

(54) OPTICAL CODE READING SYSTEM AND METHOD FOR PROCESSING MULTIPLE RESOLUTION REPRESENTATIONS OF AN IMAGE

(75) Inventors: Bradley Carlson, Northport, NY (US); Eugene Joseph, Coram, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1186 days.

(21) Appl. No.: 11/644,399

(22) Filed: Dec. 22, 2006

(65) Prior Publication Data

US 2007/0102520 A1 May 10, 2007

Related U.S. Application Data

(63) Continuation-in-part of application No. 10/891,851, filed on Jul. 15, 2004, now abandoned.

(51) Int. Cl.
*G06K 7/10* (2006.01)
(52) U.S. Cl. .................................. 235/454; 235/462.25
(58) Field of Classification Search .................. 235/454, 235/472.01, 462.22, 462.23, 462.41
See application file for complete search history.

(56) References Cited

U.S. PATENT DOCUMENTS

| | | | |
|---|---|---|---|
| 5,262,871 A | 11/1993 | Wilder et al. | |
| 5,461,491 A | 10/1995 | Degi | |
| 5,572,006 A | 11/1996 | Wang et al. | |
| 5,600,121 A | 2/1997 | Kahn et al. | |
| 6,123,264 A | 9/2000 | Li et al. | |
| 6,213,399 B1 | 4/2001 | Tsi et al. | |
| 6,250,551 B1 | 6/2001 | He et al. | |
| 6,794,627 B2 | 9/2004 | Lyon et al. | |
| 6,991,168 B2 | 1/2006 | Tsi et al. | |
| 2002/0039137 A1 | 4/2002 | Harper et al. | |
| 2005/0218231 A1 | 10/2005 | Massieu | |

FOREIGN PATENT DOCUMENTS

| | | |
|---|---|---|
| EP | 1 087 325 A2 | 3/2001 |
| EP | 1 278 099 A1 | 1/2003 |

OTHER PUBLICATIONS

Foveon's Revolutionary X3 sensor; http://www.dpreview.com/news/0202/02021101foveonx3.asp, Dec. 21, 2006.
Foveon's Revolutionary X3 sensor; http://www.dpreview.com/news/0202/02021102foveonx3.asp, Dec. 21, 2006.
International Preliminary Report on Patentability from corresponding PCT application No. PCT/US05/24902, May 2, 2007.

*Primary Examiner* — Daniel Hess
(74) *Attorney, Agent, or Firm* — Nong-Qiang Fan

(57) ABSTRACT

An optical code reading system includes an imaging engine having an illuminating assembly for illuminating a potential target area; an imaging assembly including an imaging sensor for acquiring a native image of a potential target area; and circuitry for converting the native image of a potential target area to a data signal and outputting the data signal. The data signal includes potential target area data indicative of low and high resolution representations of the native image; and at least one processor that includes means for receiving the data signal and separating the potential target area data included within the data signal into at least first and second groups of pixels indicative of the low and high resolution representations. The processor may also receive intermediate resolution representations. A corresponding imaging engine and processors capable of implementing the method of separating the high, low and intermediate resolution representations are also disclosed.

27 Claims, 11 Drawing Sheets

OPTICAL CODE READING SYSTEM AND METHOD FOR PROCESSING MULTIPLE RESOLUTION REPRESENTATIONS OF AN IMAGE

PRIORITY

This application is a continuation in part (CIP) of U.S. patent application Ser. No. 10/891,851 by Joseph et al., entitled "OPTICAL CODE READING SYSTEM AND METHOD USING A VARIABLE RESOLUTION IMAGING SENSOR," filed on Jul. 15, 2004, now abandoned.

BACKGROUND

1. Technical Field

The present disclosure relates to the field of imaging.

2. Description of the Related Art

CCD or CMOS imaging sensors are typically used in imaging devices, such as optical code reading devices for reading and decoding optical codes, such as bar codes. These sensors generally have an imaging pixel array having a plurality of photosensitive elements or pixels for capturing an image. Each pixel of the pixel array has a fixed aspect ratio (i.e., width-to-height). The aspect ratio of the pixels in an optical code reading device is generally determined by the type and/or density of the images, e.g., bar codes, to be read by the imaging device.

Due to the limited dynamic range of CCD, CMOS and other area sensors, auto-exposure systems are generally used to generate images with sufficient information content for automatic identification purposes. A typical auto-exposure system uses the output image to determine the exposure parameters. This ties the time for auto-exposure to the time it takes to transfer frames from the imaging sensor to the auto-exposure system. For CCD and most CMOS imaging sensors, the worst case time required for auto-exposure is 2-3 times the typical frame transfer time of 33 ms. This amount of time can substantially slow down the first-read times for an imager or imaging engine in an optical code reading system and significantly affect any imager's performance. (The first-read time is one of the major parameters used in evaluating imager performance.) Accordingly, a need exists for an auto-exposure system for use with a variable resolution imaging sensor in which very low resolution images are used to determine exposure parameters. The short time required to transfer the low resolution image, as opposed to a high resolution image, results in a very fast auto-exposure system (few milli-seconds).

Optical zoom systems are generally used in optical code reading devices for precisely moving at least one lens and other components of the imaging devices. Hence, these optical zoom systems require movable optical and other components which need to be precisely moved at very short distances. Accordingly, a need exists for an optical zoom system for use with a variable resolution imaging sensor for zooming in and out of a target, such as a bar code, without moving any optical and non-optical components.

In the case of an optical code reading system, informational encoded content transferred by the images generated is thereafter decoded using decoding algorithms stored as a set of programmable instructions within at least one processor or decoder of the system. The images generated by CCD and CMOS imaging sensors are generally high resolution images, thereby requiring a long period of decode time (trigger to beep) to decode their informational encoded content (in the order of 50 to over 250 ms). These decode times are too slow for high performance bar code reading applications. Accordingly, a need exists to reduce the decode time by programming a variable resolution imaging sensor to generate a low resolution image which takes less time to transfer to the at least one processor or decoder from the sensor. A need also exists for programming the variable resolution imaging sensor to continuously generate an image having a higher resolution than the previously generated image and transferring the new image (or a portion thereof) to the at least one processor or decoder, until the informational encoded content transferred by the most-recently transferred image is decoded or a predetermined period of time has lapsed.

In addition, an imaging sensor such as for barcode scanning operates by processing a low resolution representation of an image to locate a target feature such as a barcode position. Such an imaging sensor has a two-dimensional array of pixels, e.g., a 1280×1024 in an entire array, to produce a full image. The imaging sensor can be programmed to transmit any subset of pixels up to the number of pixels in the entire array. The subset can be formed by sub-sampling the entire array, by binning pixels together, or by cropping a region of pixels. The imaging sensor may perform sub-sampling or binning of the cropped region. In the case of cropping, typically only the output image of the cropped region has the same optical resolution as the full image, but a smaller field of view. The imaging sensor subsequently processes a high resolution representation of the image to decode the barcode by transferring only one image at a time at a given resolution. Only a low resolution representation of the image or a high resolution representation of the image is transferred at a time.

SUMMARY

An aspect of the present disclosure is to provide an optical code reading system having an auto-exposure system for use with a variable resolution imaging sensor in which very low resolution images are used to determine exposure parameters.

Another aspect of the present disclosure is to provide an optical code reading system having an optical zoom system for use with a variable resolution imaging sensor for zooming in and out of a target, such as a bar code, without moving any optical and non-optical components.

Another aspect of the present disclosure is to provide an optical code reading system having a variable resolution imaging sensor programmed to generate a low resolution image, thereby requiring less time to transfer the image to at least one processor or decoder for decoding.

Another aspect of the present disclosure is to provide an optical code reading system having a variable resolution imaging sensor programmed to continuously generate an image having a higher resolution than the previously generated image and transferring the new image (or a portion thereof) to at least one processor or decoder, until the informational encoded content transferred by the most-recently transferred image is decoded or a predetermined period of time has lapsed.

Another aspect of the present disclosure is to provide an optical code reading system with at least one variable resolution imaging sensor and incorporating all of the features and methodologies recited in the aspects identified above, thereby having improved performance, a high-speed auto-exposure system, a high-speed decode time for reading and decoding low- and high-density bar codes, an optical zoom system having no moveable parts, and other benefits and advantages.

In accordance with the above aspects, the present disclosure relates to an optical code reading system having an auto-exposure system for use with a variable resolution imaging sensor in which very low resolution images are used to determine exposure parameters. The very low resolution images can be transferred much faster than high resolution images which results in a very fast auto-exposure system (few milli-seconds). The present disclosure further relates to an optical code reading system having an optical zoom system for use with a variable resolution imaging sensor for zooming in and out of a target, such as a bar code, without using any moveable optical and non-optical components.

The present disclosure further relates to an optical code reading system having a variable resolution imaging sensor programmed to generate a low resolution image, thereby requiring less time to transfer the image to at least one processor or decoder for decoding. The present disclosure further relates to an optical code reading system having a variable resolution imaging sensor programmed to continuously generate an image having a higher resolution than the previously generated image and transferring the new image to at least one processor or decoder, until the informational encoded content transferred by the most-recently transferred image is decoded or a predetermined period of time has lapsed.

Additionally, the present disclosure relates to an optical code reading system with at least one variable resolution imaging sensor and incorporating all of the features and methodologies recited above, thereby having improved performance, a high-speed auto-exposure system, a high-speed decode time for reading and decoding low- and high-density bar codes, an optical zoom system having no moveable parts, and other benefits and advantages.

The present disclosure relates also to an optical code reading system that includes an imaging engine having: an illuminating assembly for illuminating a potential target area; an imaging assembly that includes: an imaging sensor for acquiring a native image of a potential target area; and circuitry for converting the native image of a potential target area to a data signal and outputting the data signal, wherein the data signal includes potential target area data indicative of a low resolution representation of the native image and a high resolution representation of the native image; and at least one processor that includes means for receiving the data signal and separating the potential target area data included within the data signal into at least a first group of pixels indicative of the low resolution representation of the native image and a second group of pixels indicative of the high resolution representation of the native image.

The at least one processor may include means for separating the potential target area data into at least a third group of pixels indicative of an intermediate resolution representation of the native image, wherein the intermediate resolution representation has a resolution between a resolution of the low resolution representation and a resolution of the high resolution representation. The at least one processor may include: a first processor that includes means for outputting the first group of pixels indicative of the low resolution representation of the native image and the second group of pixels indicative of the high resolution representation of the native image; and a second processor that includes means for receiving from the first processor the first group of pixels indicative of the low resolution representation of the native image and the second group of pixels indicative of the high resolution representation of the native image output by the first processor. The second processor may include means for processing the first group of pixels to locate an actual target in the potential target area. Additionally, the second processor may include means for processing the second group of pixels upon locating an actual target in the potential target area based upon the processing of the first group of pixels. The second processor may include also means for outputting decoded data for the actual target if the second processor decodes the actual target based on the processing of the second group of pixels. The second processor may include as well means for preparing the imaging assembly for the next imaging acquisition if no target is located in the potential target area. The second processor may include means for directing the imaging assembly to re-image the potential target area if the actual target is not decoded upon processing the second group of pixels. The imaging engine may be capable of converting the native image to the data signal at a rate of conversion, and the at least one processor may include means for receiving the data signal and separating the potential target area data included within the data signal into at least a first group of pixels indicative of the low resolution representation of the native image and a second group of pixels indicative of the high resolution representation of the native image at substantially the same rate of conversion as the rate of conversion of the native image to the data signal.

In one embodiment, the functions of the at least one processor are performed by a single processor. In addition, the imaging sensor may be a variable resolution imaging sensor capable of outputting images having at least two different resolutions.

The present disclosure relates also to an imaging engine having: an illuminating assembly for illuminating a potential target area; an imaging assembly including: an imaging sensor for acquiring a native image of a potential target area; and circuitry for converting the native image of the potential target area to a data signal and outputting the data signal, wherein the data signal includes potential target area data indicative of a low resolution representation of the native image and of a high resolution representation of the native image. The imaging sensor may be a variable resolution imaging sensor capable of outputting images having at least two different resolutions Additionally, the present disclosure relates to a processor that includes: means for receiving a data signal of a native image of a potential target area wherein the data signal includes potential target area data indicative of a low resolution representation of the native image and of a high resolution representation of the native image; means for receiving the potential target area data included within the data signal separated into at least a first group of pixels indicative of the low resolution representation of the native image and a second group of pixels indicative of the high resolution representation of the native image; and means for processing the first group of pixels to locate an actual target in the potential target area. The processor may include means for receiving the potential target area data separated into at least a third group of pixels indicative of an intermediate resolution representation of the native image, wherein the intermediate resolution representation has a resolution between a resolution of the low resolution representation and a resolution of the high resolution representation. The processor may include means for receiving the native image converted to the data signal at a rate of conversion, and means for outputting the at least first group of pixels and the second group of pixels at substantially the same rate of conversion as the rate of conversion of the native image to the data signal.

In addition, the present disclosure relates to at least one processor that includes means for receiving a data signal of a native image of a potential target area, wherein the data signal includes potential target area data indicative of a low resolution representation of the native image and potential target area pixels indicative of a high resolution representation of the native image, and wherein the at least one processor comprises means for separating the potential target area data included within the data signal into at least a first group of pixels indicative of the low resolution representation of the native image and a second group of pixels indicative of the high resolution representation of the native image. The at least one processor may include means for receiving the data signal of a native image of a potential target area from an imaging engine that is capable of converting the native image of the potential target area and outputting the data signal, and wherein the data signal includes potential target area data indicative of a low resolution representation of the native image and of a high resolution representation of the native image. The imaging engine converts the native image to the data signal at a rate of conversion, and the at least one processor may include means for separating the potential target area data included within the data signal into the at least first group of pixels indicative of the low resolution representation of the native image and the second group of pixels indicative of the high resolution representation of the native image at a rate of conversion that is substantially equal to the rate of conversion of the native image to the data signal.

The at least one processor may include means for separating the potential target area data into at least a third group of pixels indicative of an intermediate resolution representation of the native image, wherein the intermediate resolution representation has a resolution between a resolution of the low resolution representation and a resolution of the high resolution representation. The at least one processor may include means for processing the low resolution representation of the native image to locate an actual target in the potential target area, wherein the at least one processor may include means for processing the high resolution representation of the native image upon locating an actual target in the potential target area based upon the processing of the low resolution representation of the native image, and wherein, if no target is located in the potential target area, the at least one processor comprises means for preparing the imaging sensor for the next imaging acquisition. Additionally, the at least one processor may include means for outputting decoded data for the actual target if the at least one processor decodes the actual target based on the processing of the high resolution representation of the native image, and wherein the at least one processor may include means for directing the imaging sensor to re-image the potential target area if the actual target is not decoded upon processing the high resolution representation of the native image.

Furthermore, the present disclosure relates to a method for optical code reading that includes the steps of: illuminating a potential target area to acquire a native image; converting the native image to a data signal wherein the data signal includes potential target area data indicative of at least a low resolution representation of the native image and of a high resolution representation of the native image; and separating the potential target area data included within the data signal into at least a first group of pixels indicative of the low resolution representation of the native image and a second group of pixels indicative of the high resolution representation of the native image. The method may include the step of separating the potential target area data into at least a third group of pixels indicative of an intermediate resolution representation of the native image, wherein the intermediate resolution representation has a resolution between a resolution of the low resolution representation of the native image and the resolution of the high resolution representation of the native image. Also, the method may further include the step of processing the at least first group of pixels indicative of the low resolution representation of the native image to locate an actual target in the potential target area. Upon locating an actual target in the potential target area, the method may further include the step of processing the second group of pixels indicative of the high resolution representation of the native image to decode the actual target. If the actual target is decoded, the method may further include the step of outputting the decoded data for the actual target. If no target is located in the potential target area, the method may further include the step of preparing for the next imaging acquisition. If the actual target is not decoded upon processing the second group of pixels, the method may further include the step of re-imaging the potential target area. The native image is converted to the data signal at a rate of conversion, and the method may further include the step of converting the at least first group of pixels and the second group of pixels at substantially the same rate of conversion as the rate of conversion of the native image to the data signal.

The method may further include the step of processing the third group of pixels indicative of the intermediate resolution representation of the native image to locate an actual target in the potential target area. Upon locating an actual target in the potential target area, the method may further include the step of processing the second group of pixels indicative of the high resolution representation of the native image to decode the actual target. If no target is located in the potential target area, the method may further include the step of preparing for the next imaging acquisition.

BRIEF DESCRIPTION OF THE DRAWINGS

Various embodiments of the present disclosure will be described herein below with reference to the figures wherein.

DETAILED DESCRIPTION

Figure 1:
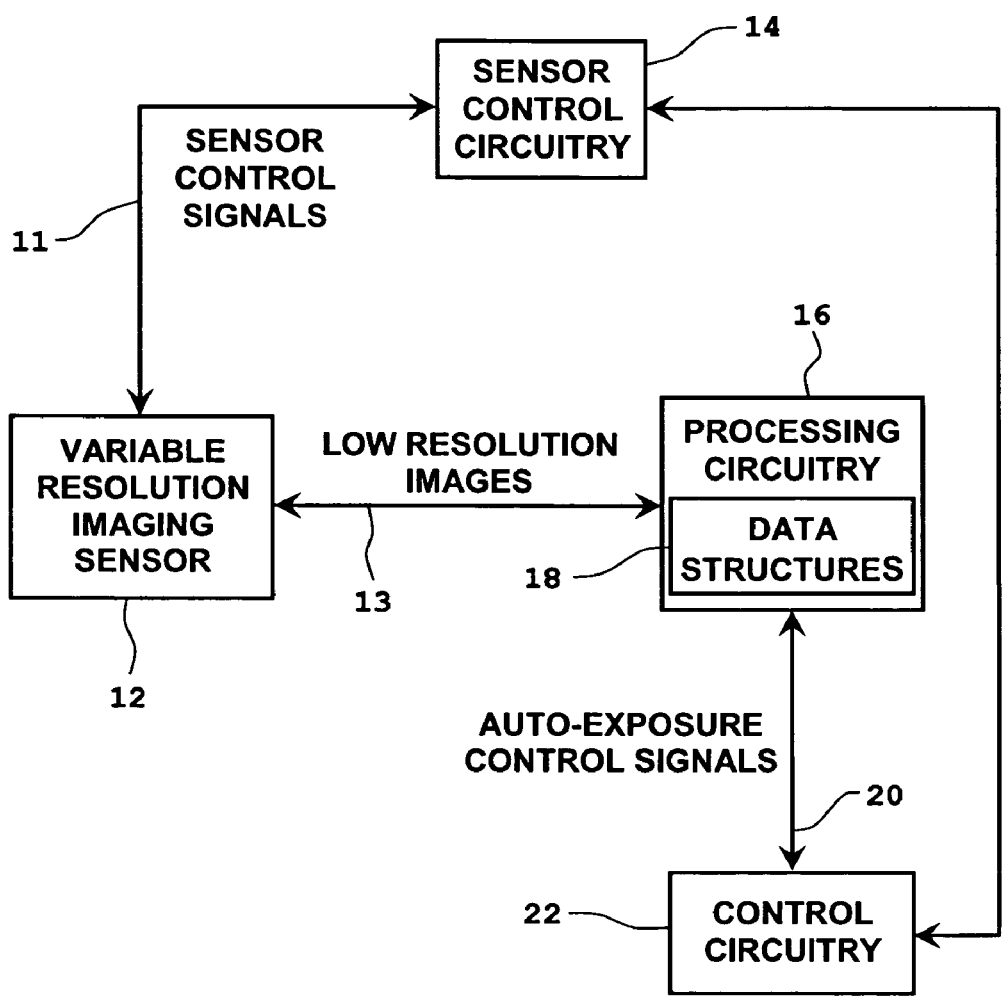
FIG. 1 is a schematic illustration of an auto-exposure system for use with a variable resolution imaging sensor of an optical code reading system in accordance with the present disclosure.

With reference to FIG. 1, there is shown a schematic illustration of an auto-exposure system for use with a variable resolution imaging sensor of an optical code reading system in accordance with the present disclosure. Even though the present disclosure is described herein with reference to an optical code reading system for imaging and decoding optical codes, such as bar codes, the aspects and features described herein can be incorporated in other systems, such as a video camera system, a digital camera system, etc.

The auto-exposure system 10 of the optical code reading system 200 (FIG. 4) makes use of a variable resolution imaging sensor 12 which is capable of generating and outputting images having at least two different resolutions, i.e., a low and a high resolution. The variable resolution imaging sensor 12 can also be capable of generating and outputting images having a plurality of resolutions ranging from low to high. The sensor 12 can be a CCD, CMOS, or other type of imaging sensor as known in the art.

The variable resolution imaging sensor 12 is programmed for outputting very low resolution images 13 when operating the auto-exposure system 10. Or, as shown by FIG. 1, the sensor 12 can be accompanied by sensor control circuitry 14 (e.g., a processor, ASIC, etc.) for controlling the sensor 12 via sensor control signals 11 for causing the variable resolution imaging sensor 12 to output low resolution images 13 when operating the auto-exposure system 10.

In a limiting case according to the present disclosure, the sensor 12 is programmed or the accompanying sensor control circuitry 14 controls the sensor to output an image consisting of a single pixel. This is equivalent to having a single photodiode facing the target field of view.

The low resolution images are then used by the auto-exposure system 10 to determine exposure parameters, such as shutter speed, sensor gain, lens aperture and brightness of illumination. Accordingly, the low resolution images are transferred to processing circuitry 16 which can include at least one processor, such as processor 62 (see FIGS. 2A and 2B) and/or an ASIC for determining exposure parameters. The processing circuitry 16 can be resident within the sensor 12, within sensor control circuitry 14, or, as shown by FIG. 1, as a separate unit. The low resolution images are transferred much faster than high resolution images used in prior art auto-exposure systems which results in a very fast auto-exposure system (few milli-seconds).

To determine exposure-related parameter values, the processing circuitry 16 first determines at least one characteristic of the low resolution image or single pixel, such as, for example, the incident light intensity of the low resolution image or single pixel. The processing circuitry 16 then correlates the determined incident light intensity or other characteristic of the low resolution image with one or more auto-exposure parameters by accessing one or more data structures 18, such as look-up tables, stored within the processing circuitry 16, as shown by FIG. 1.

For example, in accordance with the present disclosure, the processing circuitry 16 of the optical code reading system 200 determines the incident light intensity of the low resolution image or single pixel to be x and then correlates x with a look-up table corresponding to an auto-exposure parameter to determine the exposure-related parameter value associated with a light intensity of x. In the case of the low resolution image, the auto-exposure system 10 preferably takes the average intensity, or other statistical function, of the pixels at the center of the image for correlating with the auto-exposure parameter using the look-up table.

The determined light intensity x, or other characteristic of the low resolution image, can also be correlated with one or more other look-up tables corresponding to other auto-exposure parameters, either simultaneously with the first look-up table or non-simultaneously. The determined exposure-related parameter values are then used by the auto-exposure system 10 for appropriately controlling one or more aspects or features of the optical code reading system 200, such as shutter speed, sensor gain, lens aperture and brightness of illumination. As such, one or more auto-exposure control signals 20 are transmitted by the processing circuitry 16 to control circuitry 22. Upon receiving the auto-exposure control signals 20, the control circuitry 22 controls the one or more aspects or features of the optical code reading system 200 in accordance with the exposure-related parameter values.

A 2× optical zoom system of the present disclosure will now be described with reference to FIGS. 2A and 2B. The 2× optical zoom system of the optical code reading system 200 is designated generally by reference numeral 50 and makes use of a variable resolution imaging sensor 12 for zooming in and out of a target, such as a bar code, without using any moveable optical and non-optical components. The optical zoom system 50 of the optical code reading system 200 makes use of a variable resolution imaging sensor having associated circuitry, such as sensor control circuitry 14, for combining one or more rectangular sets of pixels into a single, enlarged pixel; a method referred to as binning.

One imaging sensor designed for digital cameras and having the capability of binning a rectangular set of pixels into a single, enlarged super pixel to change the size or number of pixels forming the image is the Foveon X3™ image sensor available from Foveon, Inc., Santa Clara, Calif. Without binning, the size or number of pixels of an output image generated by the Foveon X3™ image sensor is 1420×1060. With binning, the Foveon X3™ image sensor can form 2×2 super pixels to yield an output image having a size or number of pixels of 710×530; it can form 3×2 super pixels to yield an output image having a size of 473×530; and it can form 3×3 super pixels to yield an output image having a size of 473×353. Further, the Foveon X3™ image sensor has the capability to output a window of the image directly from its pixel array.

Figure 2A:
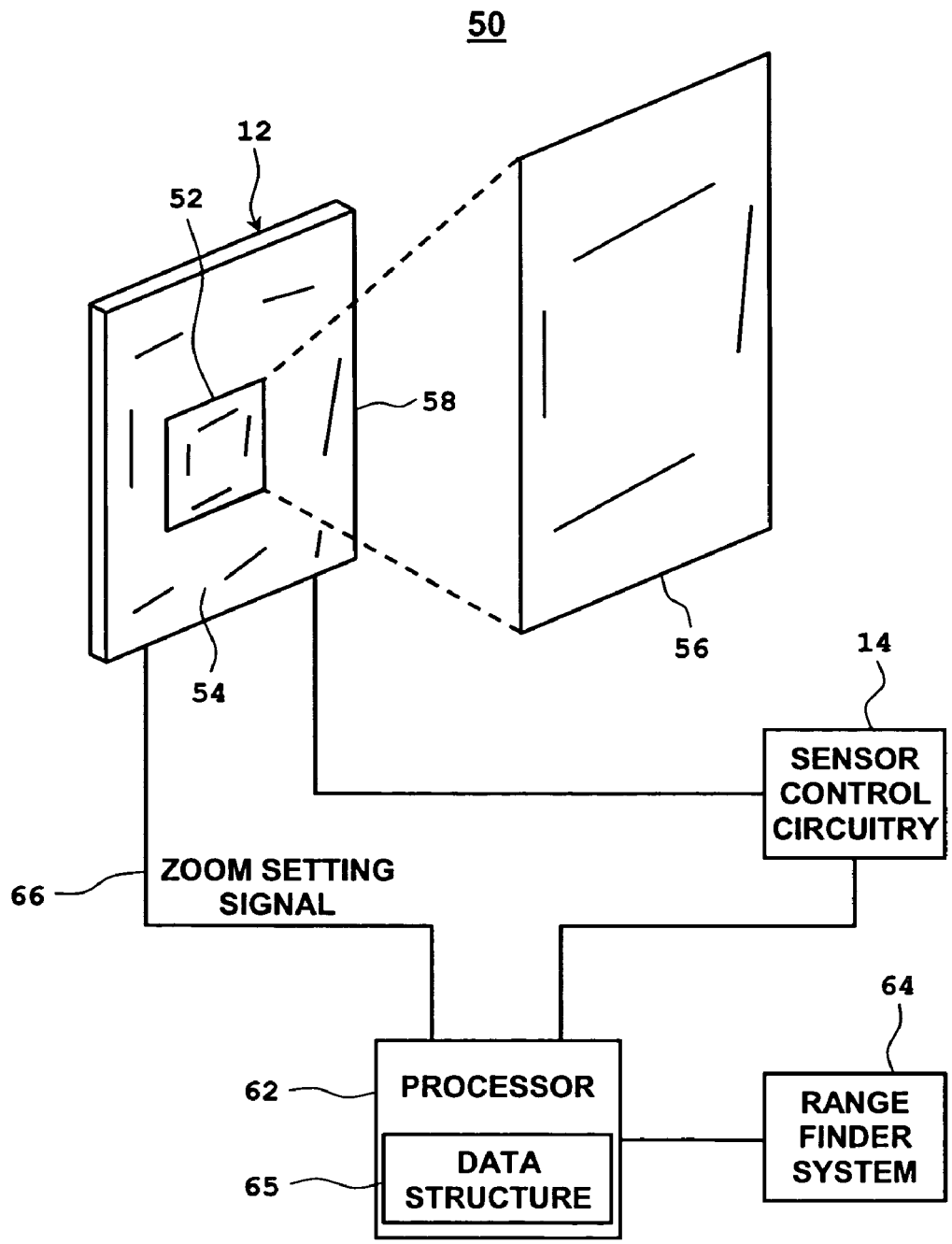
FIG. 2A is a schematic illustration of an optical zoom system using a variable resolution imaging sensor without binning for reading out the center field of view in accordance with the present disclosure.

As shown by FIG. 2A, without binning, the center field of view 52 can be read out from a pixel array 54 of the imaging sensor 12 to output an image 56 having a size or number of pixels of 710×530. Preferably, the center ¼ field of view is read out from the pixel array 54.

Figure 2B:
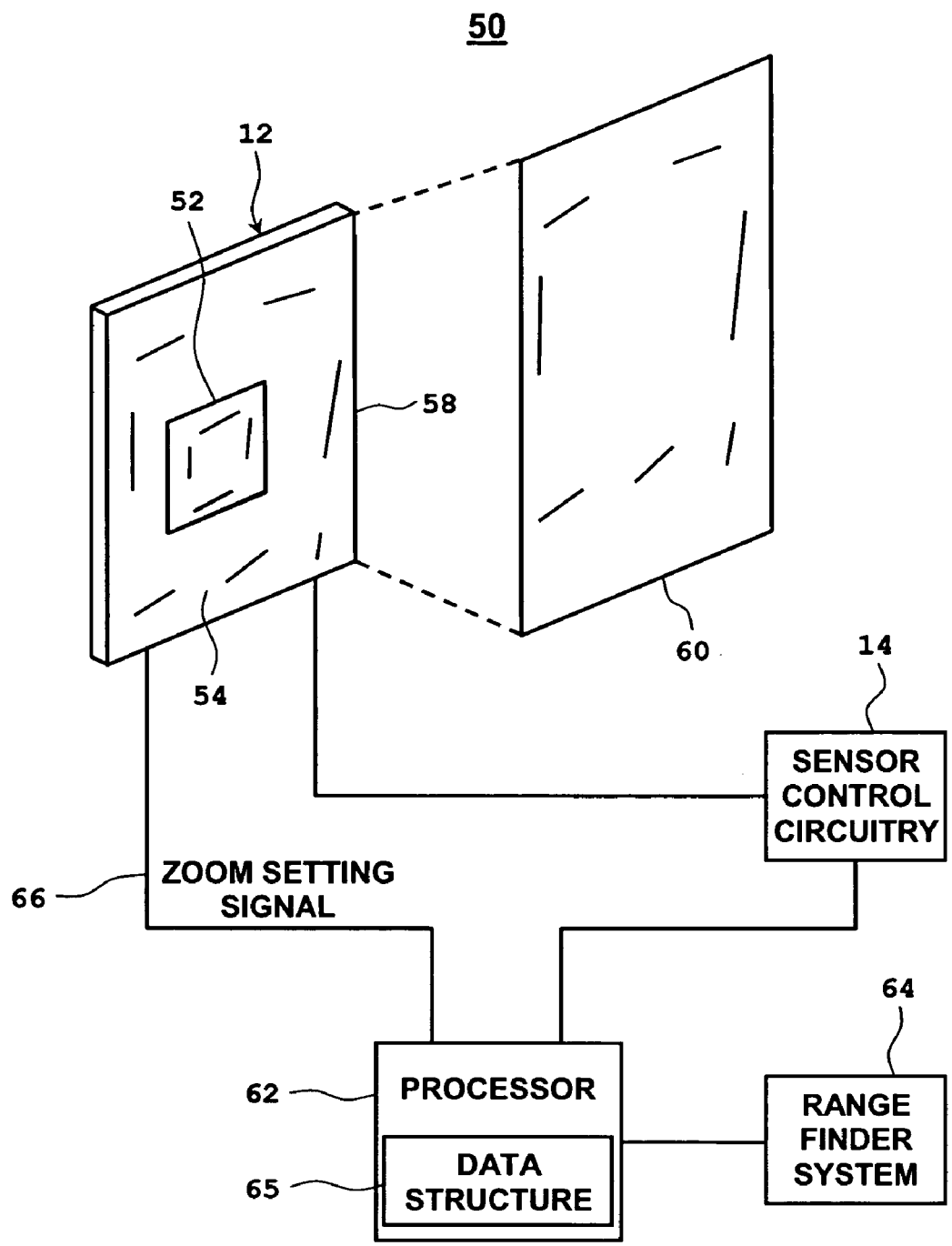
FIG. 2B is a schematic illustration of an optical zoom system using a variable resolution imaging sensor with binning for reading out the full field of view in accordance with the present disclosure.

Further, as shown by FIG. 2B, with 2×2 binning, the full field of view 58 of the pixel array 54 can be read out to output an image 60 which also has a size or number of pixels of 710×530. Accordingly, the optical zoom system 50 of the present disclosure operates exactly like a 2× optical zoom system with a sensor pixel array having a number of pixels of 710×530 and without precisely moving any optical and non-optical components.

It is also possible according to the present disclosure to vary the image resolution of the variable resolution imaging sensor 12 by subsampling pixels, e.g., reading every other pixel in the horizontal and vertical direction, without binning. That is, the outputted image is comprised of individual pixels which are not combined with other pixels.

Typically, conventional mega-pixel sensors have at least one low resolution mode and are implemented with subsampling capabilities for supporting a "viewfinder" mode on digital cameras. The present disclosure utilizes features of conventional mega-pixel sensors for auto-exposure, optical zoom and aggressive decoding of optical codes, such as bar code symbols.

The optical zoom system 50 of the optical code reading system 200 of the present disclosure further includes the processor 62. The optical zoom system 50 can also be designed to use the processing circuitry 16. The processor 62 is programmed for controlling the zoom setting of the optical zoom system 50.

The processor 62 can be provided with distance information from a range finder system 64 regarding the distance to a target, such as an optical code, from the imaging sensor 12 and accordingly correlate using a data structure 65, such as a look-up table, the distance to the target as provided by the range finder system 64 with a zoom setting. The look-up table can be stored within the processor 62, as shown by FIGS. 2A and 2B, or be resident outside the processor 62, such as in a database of the optical code reading system 200.

It is contemplated that the processor 62 accesses a different look-up table for correlating distance information with a zoom setting in accordance with the type of application for which the 2× optical zoom system 50 is being used. For example, one look-up table can provide zoom settings for imaging a one-dimensional optical code, another look-up table can provide zoom settings for imaging a two-dimensional optical code, such as a PDF417 code, another look-up table can provide zoom settings for imaging a scene, another look-up table can provide zoom settings for imaging a DPM code, etc.

Upon determining the appropriate zoom setting from at least two zoom settings using the data structure 65, the zoom setting of the optical code reading system 200 can then be changed by generating and transmitting a zoom setting signal 66 from the processor 62 to the imaging sensor 12. The zoom setting signal 66 controls the circuitry associated with the imaging sensor 12 for outputting an image having a particular resolution which provides the determined zoom setting. With this set-up, the optical zoom system 50 of the present disclosure can change the zoom setting of the optical code reading system 200 "on the fly" or instantaneously.

In the alternative, instead of using the range finder system 64 to determine distance to the target, the processor 62 of the optical zoom system 50 is programmed to alter the zoom setting in alternate image scans, until the target, such as an optical code, is adequately zoomed and successfully decoded.

The optical zoom system 50 of the present disclosure differs from digital optical zoom system commonly used in digital photography cameras. Digital optical zoom systems use all of the pixels of the imaging sensor to perform zoom functions using the process known as image interpolation to increase the number of pixels in the image.

The optical zoom system 50 does not perform zoom functions by image interpolation. The optical zoom system 50 does not use all of the pixels of the imaging sensor 12, but uses a portion of the pixels (by either binning or subsampling). If during the performance of a zoom function, it is determined by the processor 62 and/or sensor control circuitry 14 that additional pixels are needed, the number of pixels used by the optical zoom system 50 is increased (by decreasing bin or subsample size). By increasing the number of pixels, the resolution of the image is increased. Accordingly, the image resolution is increased, without using the process of image interpolation.

The optical code reading system 200 of the present disclosure can be programmed for decoding an optical code according to several methodologies for reducing decode time, i.e., the time from when the optical code is imaged by the variable resolution imaging sensor 12 to the time it is decoded, in order to enable high-speed decoding.

One methodology according to the present disclosure entails programming circuitry associated with the imaging sensor 12, such as sensor control circuitry 14, or a processor, such as, for example, the processor 62 and/or the processing circuitry 16, for controlling the imaging sensor 12 for generating a low resolution image. The required or appropriate resolution for the outputted low resolution image can be determined based on one or more of the following parameters: the type of application the optical code reading system 200 is being used for, the ambient lighting, the distance to target, the speed of target (in case the target is moving), the angle between sensor 12 and target, etc.

The low resolution image generated by the imaging sensor 12 requires less time to be transferred to at least one processor, which may include the processor 62 and/or the processing circuitry 16, and/or a decoder 518, from the imaging sensor 12 for locating the target feature, such as a start and stop pattern of an optical code, since the bit size of the low resolution image generated by the imaging sensor 12 is significantly smaller than the bit size of a high resolution image capable of being generated by the variable resolution imaging sensor 12.

Once transferred to the at least one processor or decoder, the at least one processor or decoder attempts to extract the desired information from the optical code by decoding the optical code. If the resolution of the image is sufficient, the desired information can be successfully extracted by decoding the optical code. Accordingly, this methodology uses a low resolution image to accomplish the task of imaging and decoding the optical code. This methodology also saves time, because by transferring a low resolution image to the at least one processor or decoder, the decode time is significantly reduced. The decode time is reduced in the order of four as compared to prior art optical code reading systems.

Figure 3A:
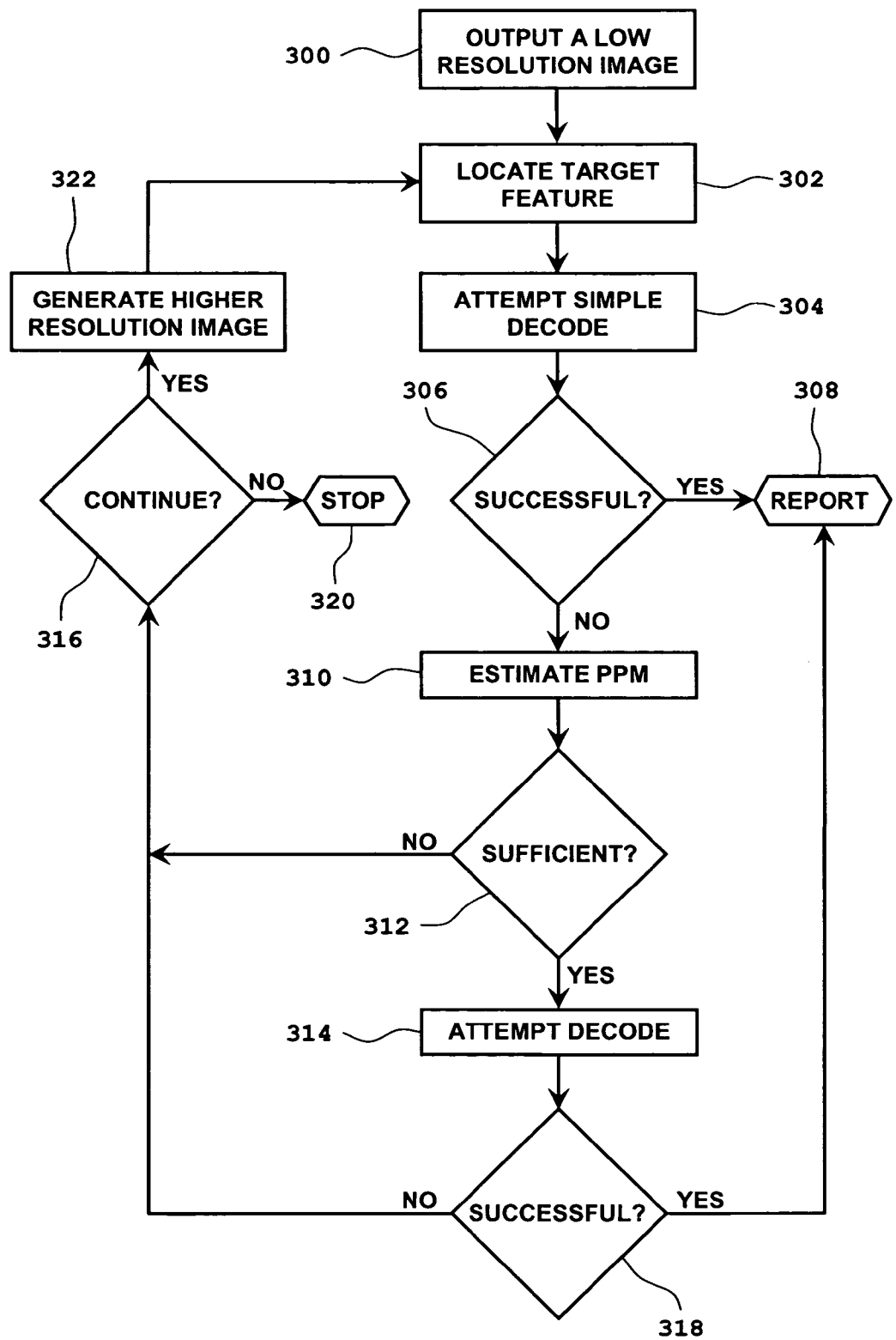
FIG. 3A is a flow chart illustrating a method of decoding an optical code using an optical code reading system in accordance with the present disclosure.

However, sometimes the required image resolution is not known ahead of time. For such applications, according to the present disclosure, the processor associated with the optical code reading system 200, which can include the processing circuitry 16 and/or the processor 62, can be programmed for executing the algorithm illustrated by the flow chart shown by FIG. 3A for decoding an optical code and reducing the decode time. The algorithm is configured as a set of programmable instructions stored in a memory and capable of being executed by the processor and/or the sensor control circuitry 14.

At step 300, the imaging sensor 12 is controlled by a processor, which can include the processing circuitry 16 and/or processor 62, or the sensor control circuitry 14 for generating an image having a particular resolution, and preferably, the lowest, useful resolution that can be generated by the sensor 12. (The lowest, useful resolution can be defined by the application; e.g., the density of the bar codes being read.) The lowest resolution image is then outputted for use in locating a target feature, such as a bar code, by the processor at step 302. It is contemplated that the image generated is not the lowest resolution image that can be generated but an image which has a low resolution for providing a starting point in attempting to locate the target feature by the processor.

At step 304, the process attempts a simple decode of the located target feature. At step 306, a determination is made as to whether the bar code was successfully decoded in step 304. If yes, the result is reported to a user of the optical code reading system in step 308. If no, the process continues to step 310 where the low resolution image's pixels per module (PPM) is estimated. If the estimated PPM is sufficient to decode the target feature as determined at step 312, an attempt is made at step 314 to decode the target feature. If the estimated PPM is not sufficient to decode the target feature, the process continues to step 316.

If the attempted decode at step 314 is successful as determined at step 318, the result is reported to the user at step 308. If the attempted decode is not successful, the process continues to step 316. At step 316, a determination is made as to whether to continue with the decoding process, i.e., whether to generate and output a higher resolution image. If no, as determined, for example, by a system clock or based according to how many times the process has reached step 316, the process terminates at step 320. If at step 316, the decision is to continue with the decoding process, the process continues to step 322 where the higher resolution image is generated and outputted by the variable resolution imaging sensor 12. The process then repeats starting with step 302 for locating the target feature. It is preferred that the newly generated, higher resolution image is cropped such that the image is centered with respect to the location of the target feature.

It is necessary to determine at step 316 whether to continue with the process in order for the process to be able to move on to decode another optical code. This may be required in the case where the system 200 is used to image optical codes passing on a conveyor belt to prevent the optical code reading system 200 from "falling behind" in imaging and decoding the optical codes passing by.

The methodology described above attempts to determine at what resolution is the target feature adequately visible for decoding. Since low resolution images are generated and transmitted to the processor much faster than high resolution images, the amount of time expensed for determining an appropriate or desired low resolution for decoding the target feature is significantly less than the time capable of being expensed if a high resolution image is generated and transferred to the processor for decoding, even though with the methodology described herein multiple low resolution images may need to be generated and transferred to the processor before the target feature is decoded.

Figure 3B:
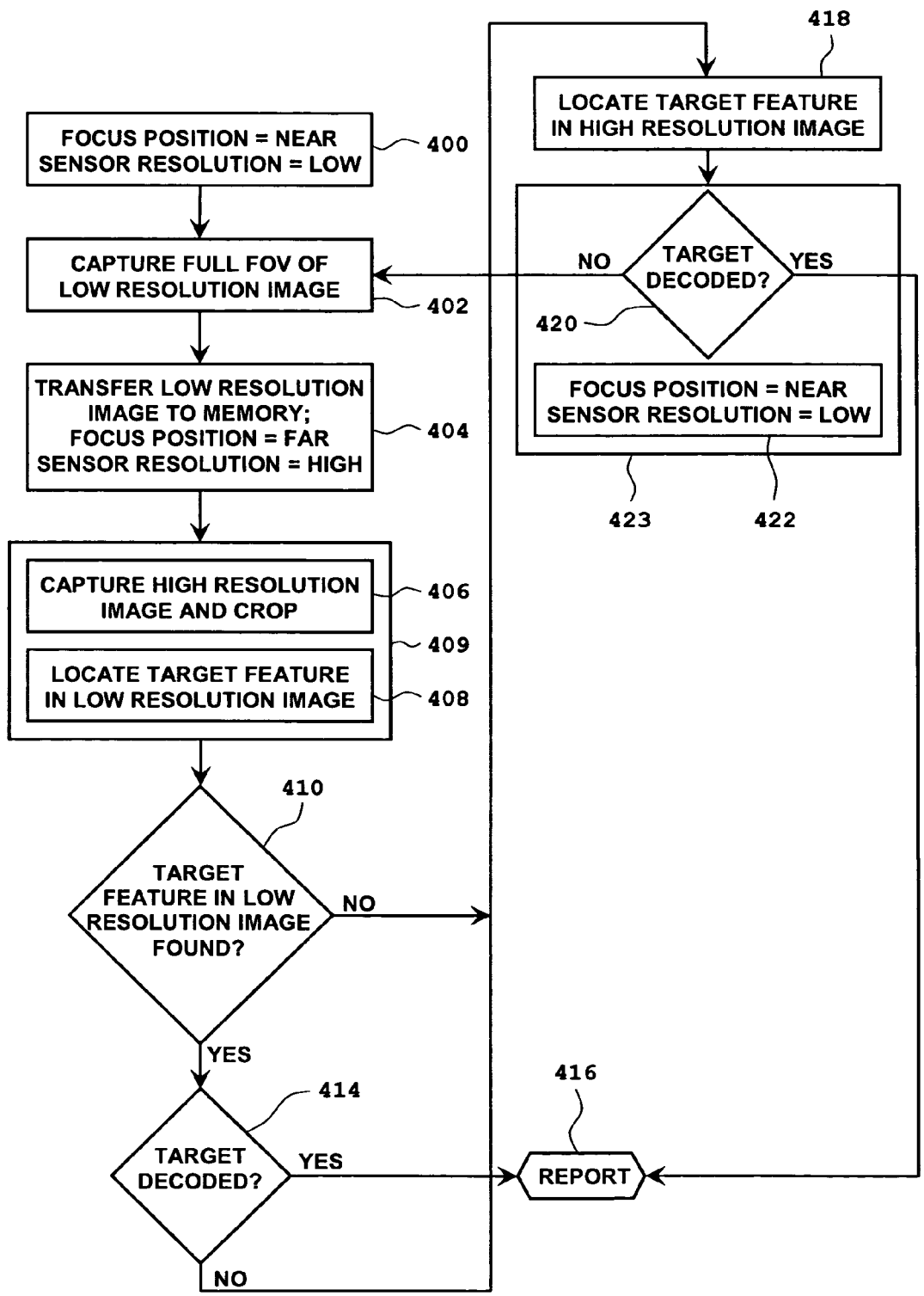
FIG. 3B is a flow chart illustrating another method of decoding an optical code using an optical code reading system in accordance with the present disclosure.

The methodology described above with reference to FIG. 3A can be modified into a two-stage resolution algorithm for performing a methodology as illustrated by the flow chart shown by FIG. 3B for the optical code reading system 200. The optical code reading system 200 includes a two-position focus system 202 with positions NEAR 204 and FAR 206 and the imaging sensor 12 being modified for delivering at least two image resolutions, HI_RESOLUTION (high resolution) and LOW_RESOLUTION (low resolution). The NEAR position 204 captures a larger image of the target and the FAR position 206 captures a smaller, cropped image of the target. In effect, this implements a 2× optical zoom system. The system 200 is also modified for capturing two images, HI_RES_IMAGE (high resolution image) and LOW_RES_IMAGE (low resolution image).

The two-stage resolution algorithm is performed by the processor of the optical code reading system 200, which can include the processing circuitry 16 and/or the processor 62, by executing a series of programmable instructions. The methodology decreases the decode time while improving the overall performance of the optical code reading system 200.

The methodology according to the present disclosure entails starting at step 400 in FIG. 3B and setting the focus position to NEAR and sensor resolution to LOW_RESOLUTION. At step 402, a full field of view (FOV) image is captured of the LOW_RES_IMAGE. At step 404, the LOW_RES_IMAGE is transferred to a memory of the optical code reading system, the focus position is set to FAR and sensor resolution is set to HI_RESOLUTION. These three action items are preferably performed simultaneously.

At step 406, the HI_RES_IMAGE is captured and a cropped image thereof centered with respect to the optical axis of the optical code reading system is transferred to the memory. At step 408, which is performed simultaneously with step 406 as mega step 409, the process retrieves the LOW_RES_IMAGE stored in the memory, and analyzes or processes the LOW_RES_IMAGE in an attempt to locate the target feature in the LOW_RES_IMAGE. At step 410, a determination is made as to whether the target feature in the LOW_RES_IMAGE was found. If the target feature was not found, the process continues to step 418.

If the target feature in the LOW_RES_IMAGE was found in step 410, the process in step 414 attempts to extract information or decode the target corresponding to the target feature found in the LOW_RES_IMAGE. If in step 414, the target is decoded or the information is extracted, the result is reported to a user of the optical code reading system in step 416 and the process terminates at step 412.

However, if in step 414 the information is not extracted or the target feature is not decoded due to the low resolution of the LOW_RES_IMAGE (or if the target feature in the low resolution image is not found at step 410), the process in step 418 locates the target feature in the HI_RES_IMAGE. The process in step 420 then attempts to extract information or decode the target corresponding to the target feature found in the HI_RES_IMAGE. Simultaneously with step 420, the focus position is set to NEAR and the sensor resolution is set to LOW_RESOLUTION in step 422. Steps 420 and 422 are performed simultaneously as mega step 423.

If information is extracted in step 420 or the target is decoded, the result is reported to the user of the optical code reading system in step 416 and the process terminates at step 412. However, if in step 420 the information is not extracted or the target is not decoded, the process proceeds to step 402 and is repeated until the information is extracted or the target is decoded, until a maximum number of iterations is reached, or until a predetermined amount of time as determined by the processor has lapsed.

As stated above, all of the methods described herein in accordance with the present disclosure for decoding an optical code are performed by the processor, which may include processing circuitry 16 and/or the processor 62, of the optical code reading system 200. The processor executes a series of programmable instructions for performing the described methods. The series of programmable instructions can be stored within a memory of the processor, a memory of the optical code reading system 200, or on a computer-readable medium, such as a CD-ROM, floppy disc, hard drive, etc.

Figure 4:
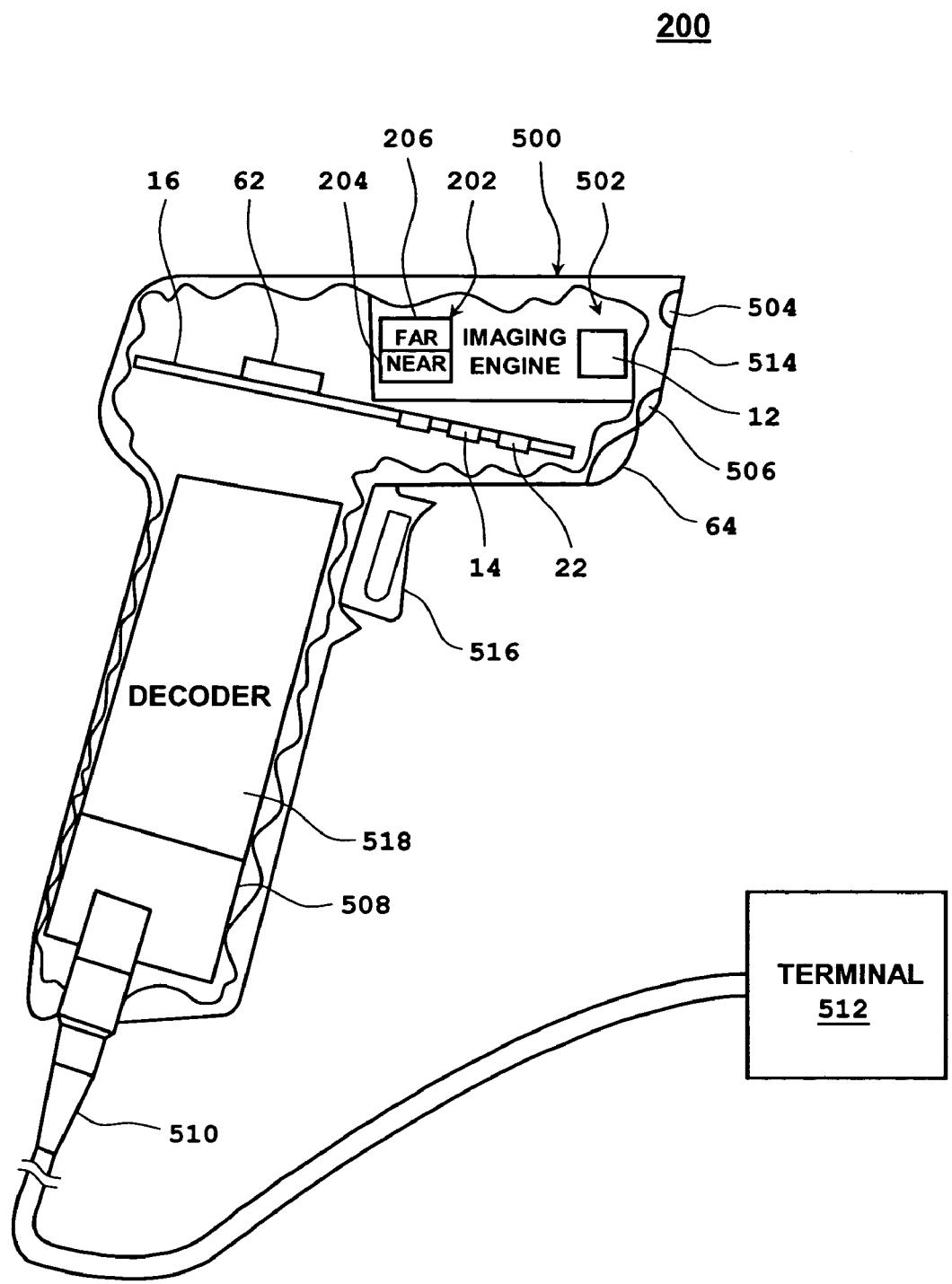
FIG. 4 is a schematic illustration of an optical code reading system having an imaging device in accordance with one embodiment of the present disclosure.

An exemplary optical code reading system 200 having features described herein is schematically illustrated by FIG. 4 and includes an imaging device, such as a bar code reader, designated generally by reference numeral 500. The imaging device 500 houses the variable resolution imaging sensor 12 described above and packaged in the form of an imaging engine 502, an illumination source 504 having at least one LED or other light generating device, an aiming source 506 having a light source for aiming at an optical code (e.g., a bar code) or target to be imaged, sensor control circuitry 14, processing circuitry 16, control circuitry 22, processor 62, range finder system 64, and communication circuitry 508 interfaced with cable 510 for non-wirelessly transmitting signals to a terminal 512, such as a point-of-sale terminal. Alternatively, the optical code reading system 200 may be designed for wireless operation.

The imaging engine 502 is configured and dimensioned for fitting within a predetermined form factor 514 of the imaging device 500, such as the SE1200 form factor developed by Symbol Technologies, Inc., and includes the two-position focus system 202 with positions NEAR 204 and FAR 206. The processing circuitry 16, control circuitry 22 and/or the processor 62 control the operation of the imaging device 500, such as the auto-exposure system 10, the optical zoom system 50, the means for actuating an image and decode process upon a user pressing a trigger button 516, controlling the illumination source 504, the aiming source 506 and the communication circuitry 508, for operating the imaging device 500 in a particular imaging mode, such as a continuous imaging mode, and for executing a set of programmable instructions for decoding the imaged optical code or target or controlling operation of the decoder 518 for decoding the imaged optical code or target. The decoder 518 can be external to the processing circuitry 16 or the processor 62, as shown by FIG. 4, or resident within the processing circuitry 16 or the processor 62.

The processing circuitry 16, the control circuitry 22 and/or the processor 62 further include a memory for storing pixel output data and other data, such as the sets of programmable instructions for performing the high-speed decoding methods described herein. The processing circuitry 16, the control circuitry 22 and/or the processor 62 further determine an imaging resolution for imaging the optical code and control the variable resolution imaging sensor 12 either directly or via the sensor control circuitry 14 for imaging the optical code according to the determined imaging resolution.

The communication circuitry 508 outputs data indicative of the decoded and/or processed optical code or target to an external computing device, such as terminal 512, and receives data, such as data for changing at least one operational parameter of the imaging device 500 as known in the art. The operational parameters can also be changed by imaging an optical code or target corresponding to at least one operational parameter and decoding and/or processing the imaged optical code or target, and subsequently changing the at least one operational parameter indicative of the decoded and/or processed optical code or target.

Referring to FIGS. 5, 6A-6D, 7A-7B, and 8, the present disclosure relates to an optical code reading system 600 wherein multiple representations of a native image 604 of a potential target area 602 can be transmitted concurrently from an imaging sensor 520 of an imaging device 500'. The imaging device 500' is similar to the imaging device 500 described above with respect to FIG. 4, with differences identified below.

Figure 5:
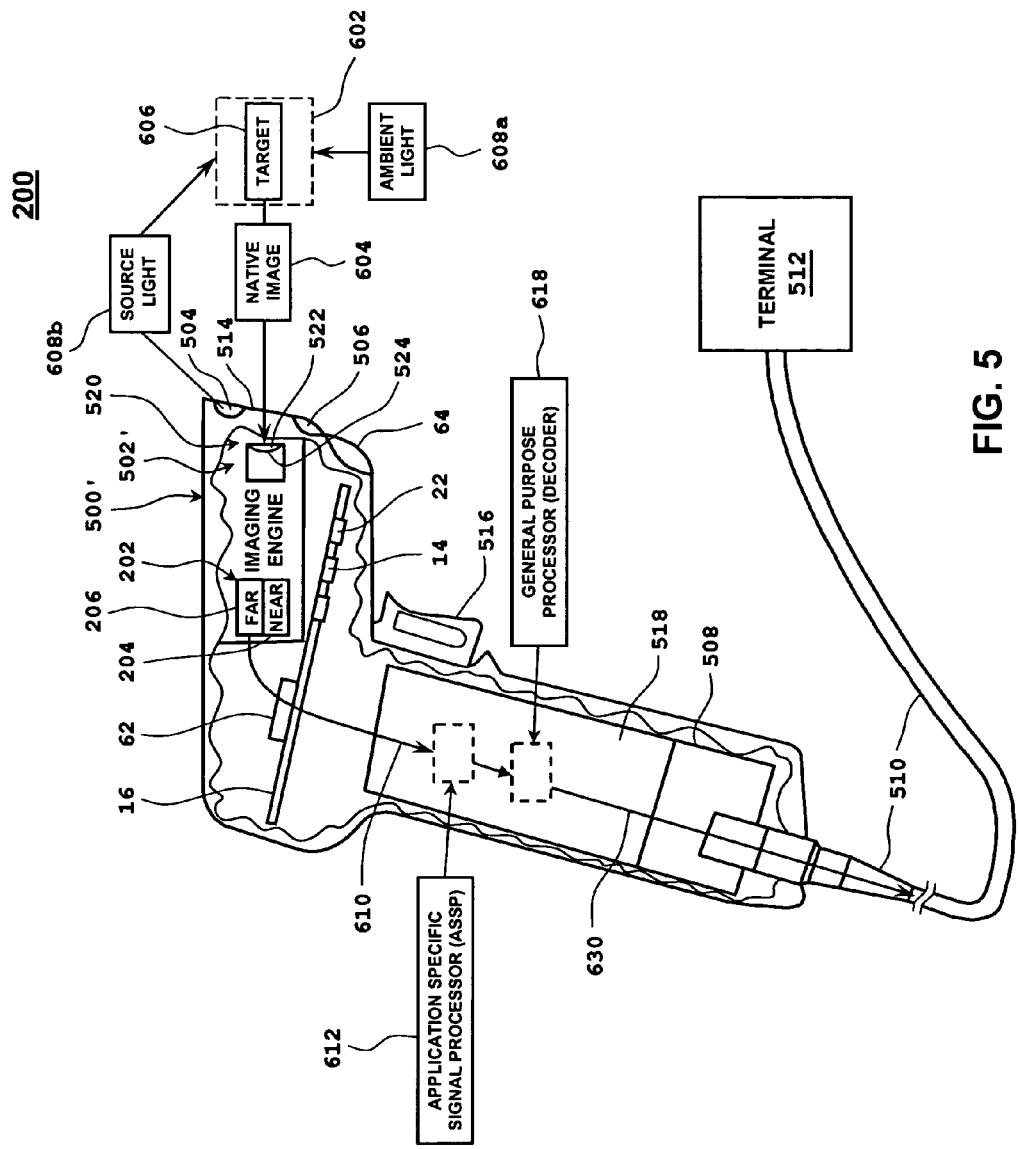
FIG. 5 is a partially schematic illustration of an optical code reading system having an imaging device for use with multiple resolution representations of an image in accordance with another embodiment of the present disclosure.

Referring particularly to FIG. 5, the imaging device 500' includes an imaging engine 502' having the illuminating assembly 504 for illuminating the potential target area 602, and an imaging assembly 520. The imaging assembly 520 includes an imaging sensor 522 for acquiring the native image 604 and processing circuitry 16' for converting the native image 604 of the potential target area 602 to a first data signal 610 and for outputting the first data signal 610.

As is the case with imaging engine 502, the imaging sensor 522 may be a variable resolution imaging sensor capable of outputting images having at least two different resolutions. Although shown in FIG. 5 for simplicity as being external to the imaging sensor 522, the native image 604 actually appears in lens 524 of the imaging sensor 522. As particularly illustrated in FIGS. 5 and 7A, a target 606 may exist in the potential target area 602. The potential target area 602 may be illuminated by ambient light 608a or by source light 608b from the illumination source 504.

Figure 6A:
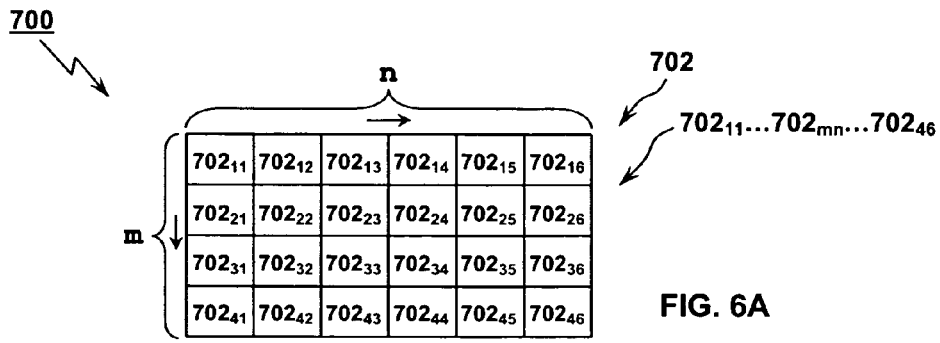
FIG. 6A is a simplified illustration of an array of pixels present in the imaging device of FIG. 5 in which the pixels form a high resolution representation of the image.
Figure 6B:
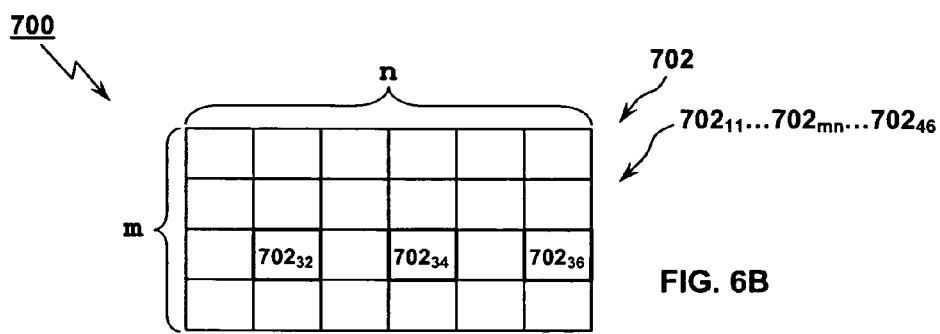
FIG. 6B is a simplified illustration of an array of pixels present in the imaging device of FIG. 5 in which the pixels are sub-sampled to form a low resolution or an intermediate resolution representation of the image.
Figure 6C:
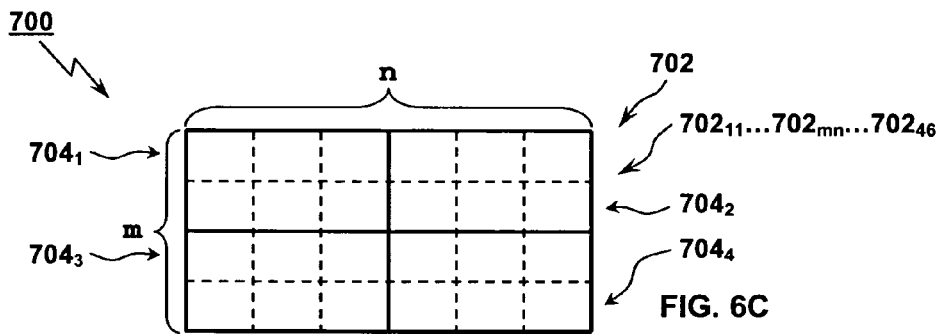
FIG. 6C is a simplified illustration of the array of pixels present in the imaging device of FIG. 5 in which the pixels are binned to form a low resolution or an intermediate resolution representation of the image.

FIGS. 6A-6C illustrate a two-dimensional array 700 of pixels 702 having an array dimension of m×n. For the sake of simplicity, the two-dimensional array 700 of pixels 702 is illustrated as a 4×6 array, i.e., m=4 and n=6, but in actuality, a full array may have exemplary dimensions of say m=1024 and n=1280.

Figure 7A:
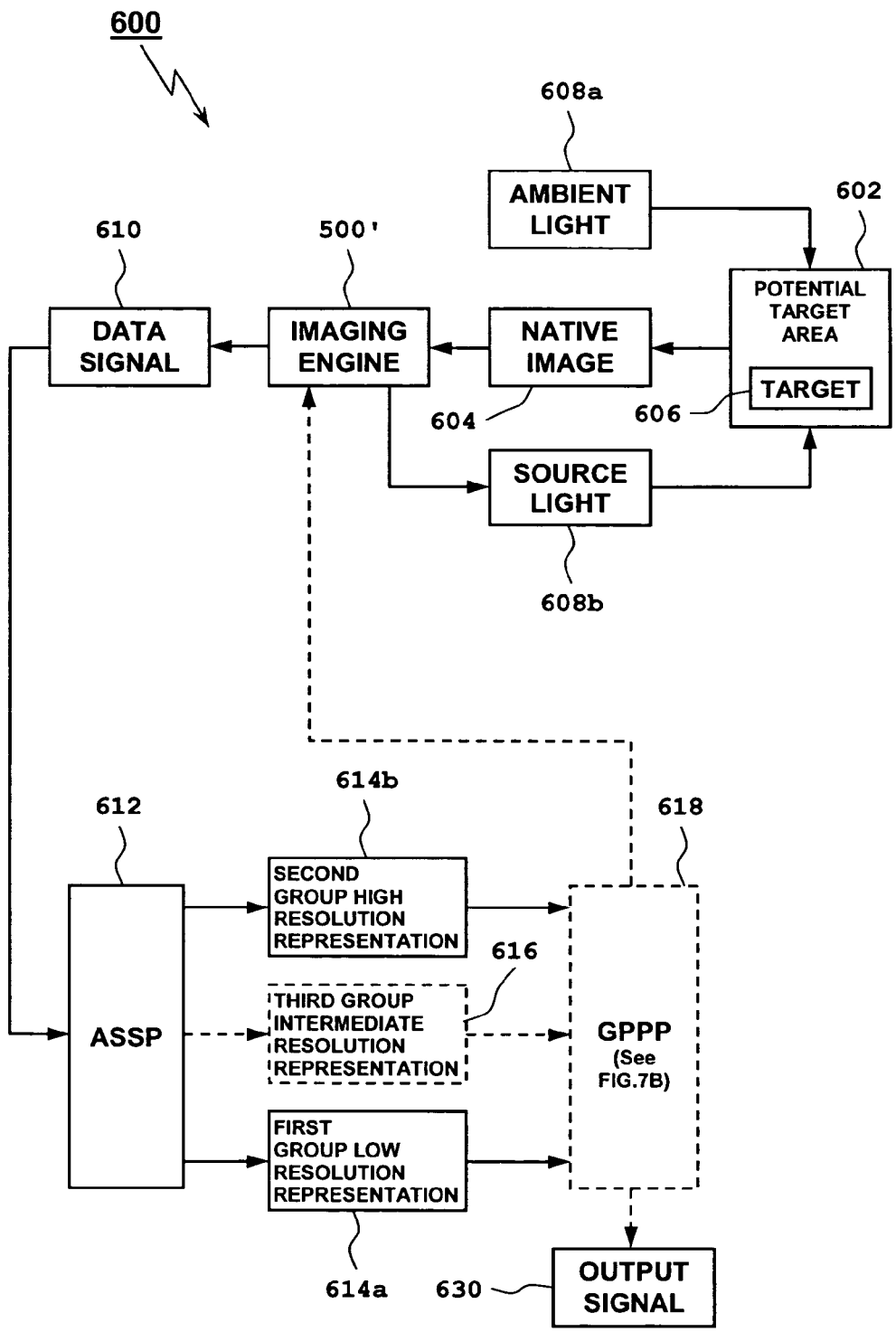
FIG. 7A is a schematic illustration of the optical code reading system having an imaging device according to FIG. 5.

As illustrated in FIG. 6A, such an array 700 of 1024×1280 pixels 702 forms a high resolution representation of the native image 604 of the potential target area 602 (see FIGS. 5 and 7A). The array 700 is designated as ranging from $702_{11}$ to $702_{mn}$. FIG. 6B illustrates a method of sub-sampling of the native image pixels 702. For example, in a low resolution representation of the native image 604, or in an intermediate resolution representation of the native image 604, only pixels that are not adjacent to each other, e.g., every other pixel as exemplified in FIG. 6B as pixels $702_{32}$, $702_{34}$, and $702_{36}$, or every other pair of pixels (not shown), are sampled for converting the native image 604 and outputting a data signal.

FIG. 6C illustrates a method of binning of the native image pixels 702. For example, in a low resolution representation of the native image 604 or in an intermediate resolution representation of the native image 604, pixels 702 are binned, e.g., binned into four bins, e.g., bins $704_1$, $704_2$, $704_3$ and $704_4$, of 2×3 (i.e., four bins of 256×320 pixels based on a 1024×1280 array) such as pixels $702_{11}$, and $702_{21} \times 702_{11}$, and $702_{12}$ and $702_{13}$, to form a low resolution or an intermediate resolution representation of the native image 604.

Figure 6D:
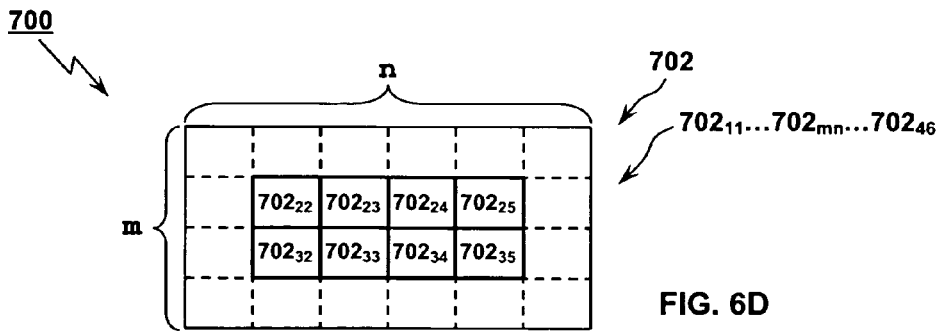
FIG. 6D is a simplified illustration of the array of pixels present in the imaging device of FIG. 5 in which the pixels are cropped to form a low resolution or an intermediate resolution representation of the image.

Similarly, FIG. 6D illustrates a method of cropping of the native image pixels 702. For example, in a low resolution representation of the native image 604 or in an intermediate resolution representation of the native image 604, the pixels 702 along the border of the array 700, e.g., pixels $702_{11}$, $702_{21}$, $7023_{31}$, $702_{41}$; and $702_{12}$, $702_{13}$, $702_{14}$, $702_{15}$, $702_{16}$; and $702_{26}$, $702_{36}$, $702_{46}$; and $702_{45}$, $702_{44}$, $702_{43}$, $702_{42}$, $702_{41}$ are cropped from the representation of the native image 604, leaving only pixels $702_{22}$, $702_{23}$, $702_{24}$, $702_{25}$, $702_{32}$, $702_{33}$, $702_{34}$, $702_{35}$ to form a cropped array 706 of the low resolution or intermediate representation of the native image 604. Thus, the data signal 610 includes potential target area data indicative of multiple resolutions of the native image 604, e.g., a low resolution representation of the native image 604 and a high resolution representation of the native image 604. As also illustrated above, the data signal 610 may also include potential target area data indicative of an intermediate resolution representation of the native image 604.

Again referring to FIGS. 5 and 7A, the optical code reading system 600 also includes at least one processor, e.g., application specific signal processor (ASSP) 612, that includes means for, e.g., at least one of firmware, software and hardware adapted for, receiving the data signal 610 and for separating the potential target area data included within the data signal 610 into at least a first group of pixels 614a indicative of the low resolution representation of the native image 604 and a second group of pixels 614b indicative of the high resolution representation of the native image 604.

As defined herein, the processor performing functions and methods described herein in accordance with the present disclosure includes at least one of firmware, software and hardware means for performing the particular function or method. The data signal 610 may be a video signal and may be transmitted by hard wire or cable to the processor 612, or be transmitted wirelessly or contactlessly to the processor 612 via a radiofrequency signal, an optical signal, an acoustic signal, or a vibrational signal. The embodiments are not limited in this context.

In one embodiment, the at least one processor, e.g., ASSP 612, includes means for separating the potential target area data into at least a third group of pixels 616 indicative of an intermediate resolution representation of the native image 604. The intermediate resolution representation has a resolution between a resolution of the low resolution representation and a resolution of the high resolution representation. For example, the high resolution representation of the native image may be formed by the array 700 of 1024×1280 pixels 702 described above with respect to FIG. 6A, while the low resolution representation of the native image 604 may be formed by the binning of the pixels 702 into four bins of 2×3 (i.e., four bins of 256×320 pixels based on a 1024×1280 array) such as pixels $702_{11}$, and $702_{21} \times 702_{11}$, and $702_{12}$ and $702_{13}$ described above with respect to FIG. 6C. The intermediate resolution representation of the native image 604 may be formed by binning of the pixels 702 into eight bins of 1×3 (i.e., eight bins of 128×320 pixels based on the 1024×1280 array). The eight bins may be formed by dividing the four bins $704_1$, $704_2$, $704_3$ and $704_4$ horizontally.

As best illustrated in FIG. 7A, the imaging engine 502' is capable of converting the native image 604 to the data signal 610 at a particular rate of conversion. The at least one processor, e.g., ASSP 612, may include means for receiving the data signal 610 and separating the potential target area data included within the data signal 610 into at least the first group of pixels 614a indicative of the low resolution representation of the native image 604 and the second group of pixels 614b indicative of the high resolution representation of the native image at substantially the same rate of conversion as the rate of conversion of the native image 604 to the data signal 610.

In one embodiment, at least one of the low resolution representation of the native image, e.g., the bins of pixels $704_1$, $704_2$, $704_3$ and $704_4$ (see FIG. 6C), and the high resolution representation of the native image, e.g., the full array 702 (see FIG. 6A) may be composed of at least one of statistical computations; digital filter outputs; and data derived from pixel values of the native image 604. Examples of statistical computations, e.g., the calculation of surface tangent vectors; digital filter outputs; and data derived from pixel values of the native image 604 are described in commonly assigned U.S. Pat. No. 6,250,551 by He et al, "AUTODISCRIMINATION AND LINE DRAWING TECHNIQUES FOR CODE READERS", issued Jun. 26, 2001, the entire contents of which are incorporated by reference herein. Additionally, examples of statistical computations are described in commonly assigned U.S. patent application Ser. No. 11/240,420, "PROCESSING IMAGE DATA FROM MULTIPLE SOURCES," filed on Sep. 30, 2005, the entire contents of which are incorporated by reference herein.

Figure 7B:
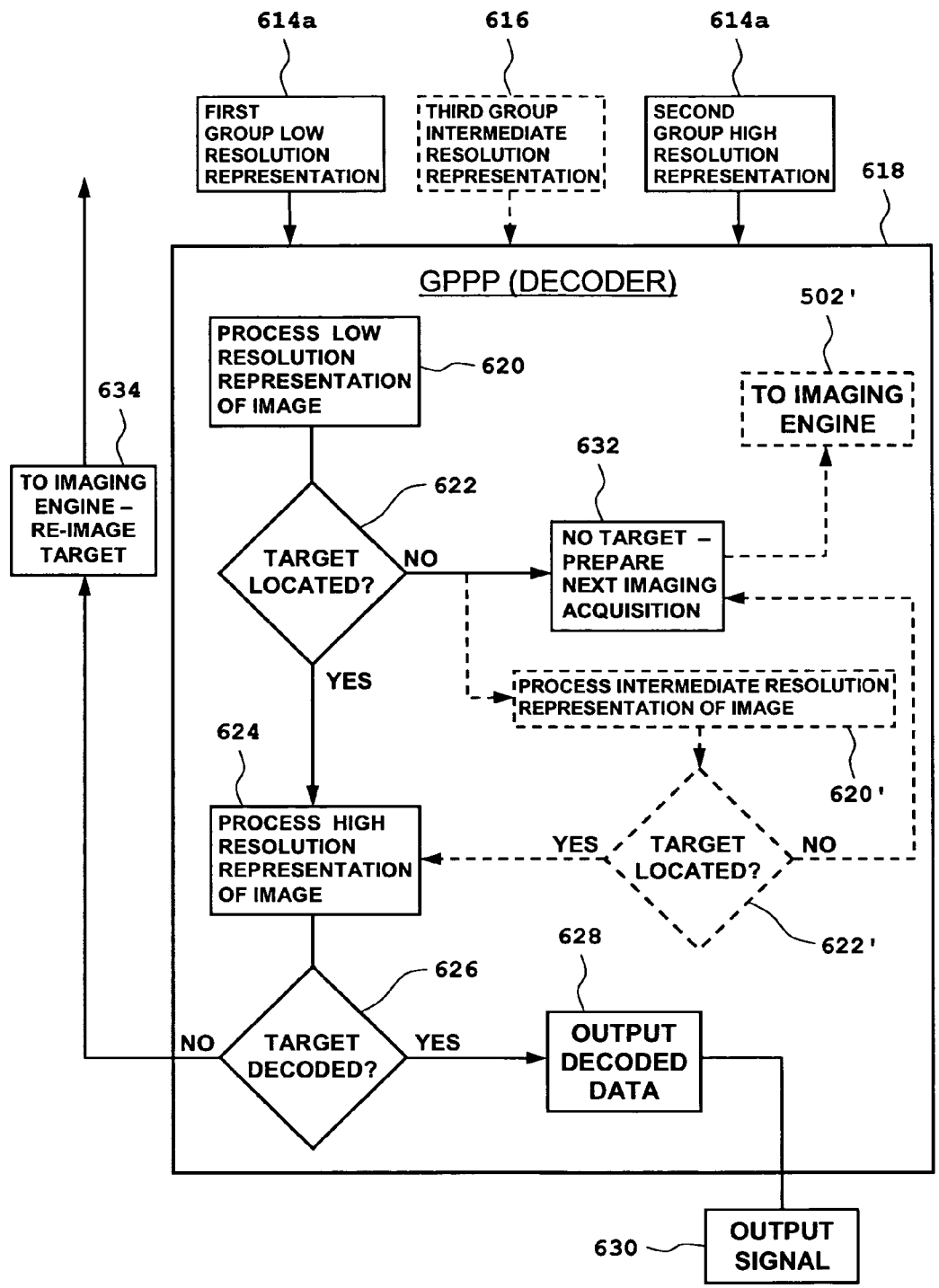
FIG. 7B is a continuation of FIG. 7A of the schematic illustration of the optical code reading system having the imaging device of FIG. 5.

In one exemplary embodiment, as illustrated in FIGS. 5 and 7A-7B, the at least one processor includes a first processor, e.g., the ASSP 612, that includes means for outputting the at least first group of pixels 614a indicative of the low resolution representation of the native image and the second group of pixels 614b indicative of the high resolution representation of the native image; and a second processor, e.g., a general purpose programmable processor (GPPP) 618.

FIG. 7B is a flow chart illustrating schematically the at least one of firmware, software and hardware means for performing the particular functions or methods performed by the second processor, e.g., GPPP 618. The second processor, e.g., GPPP 612, includes means for receiving from the first processor, e.g., ASSP 612, the first group of pixels 614a indicative of the low resolution representation of the native image and the second group of pixels 614b indicative of the high resolution representation of the native image 604 output by the first processor 612. The second processor 618 may include means 620 for processing the first group of pixels 614a to locate an actual target, e.g., target 606, in the potential target area 602. The second processor 618 may include means 624 for processing the second group of pixels 614b upon locating an actual target, e.g., target 606 at decision point 622, in the potential target area 602 based upon the processing of the first group of pixels 614a via processing means 620.

If the second processor 618, which may function as a decoder, decodes the actual target 606 based on the processing of the second group of pixels 614b, as determined at decision point 626, the second processor 618 includes means 628 for outputting decoded data, as an output data signal 630, for the actual target 606 (see FIG. 5).

In one embodiment, the output data signal 630 may be transferred via the communication circuitry 508 interfacing with cable 510 for non-wirelessly transmitting the signal 630 to the terminal 512, such as a point-of-sale terminal or to another optical code reader that may be suitable for an automated inspection task, including optical character recognition (OCR) of text and decoding of barcodes.

If no target is located in the potential target area 602, as determined at decision point 622, the second processor, e.g., GPPP 618, includes means 632 for preparing the imaging engine 502', and particularly the imaging assembly, for the next imaging acquisition (see FIG. 5).

If the actual target 606 is not decoded upon processing the second group 614b of pixels, as determined at decision point 626, the second processor, e.g., GPPP 618, may include means 634 for directing the imaging engine 502', and particularly the imaging assembly 520, to re-image the potential target area 602.

In one embodiment, referring still to FIG. 7B, if no target is located in the potential target area 602, as determined at decision point 622, the second processor, e.g., GPPP 618, may include means 620' for processing the third group 616 of pixels indicative of an intermediate resolution representation of the native image 604, e.g., eight bins of pixels 702, as described above with respect to FIG. 6C as an example. If a target, e.g., target 606, is located in the potential target area 602, as determined at decision point 622', the second processor, e.g., GPPP 618, may transfer to the means 624 for processing the second group 614b of pixels indicative of a high resolution representation of the native image 604. Alternatively, if no target is located in the potential target area 602, as determined at decision point 622', the second processor 618 may transfer to the means 632 for preparing the imaging engine 502', and particularly the imaging assembly 520, for the next imaging acquisition.

Although not specifically illustrated in the figures, those skilled in the art will recognize that, and understand how, the functions and methods of first and second processors 612 and 618, respectively, described above may be performed by a single processor. The single processor may be one of an application specific integrated circuit (ASIC), such as application specific signal processor (ASSP) 612, and a general purpose programmable processor, such as GPPP 618.

Those skilled in the art will recognize that, and understand how, the present disclosure relates also to the imaging device 500' as a standalone apparatus, exclusive of the optical code reading system 600. In addition, those skilled in the art will recognize that, and understand how, the present disclosure relates also to the first processor, e.g., application specific signal processor (ASSP) 612, as a standalone apparatus, exclusive of the optical code reading system 600. Similarly, those skilled in the art will recognize that, and understand how, the present disclosure relates also to the second processor, e.g., general purpose programmable processor 618, as a standalone apparatus, exclusive of the optical code reading system 600 and of the ASSP 612.

In addition, the ASSP 612 is illustrated in FIG. 5 as residing with the GPPP 618 by way of example only. Alternatively, the ASSP 612 may reside in the imaging engine 502'.

Figure 8:
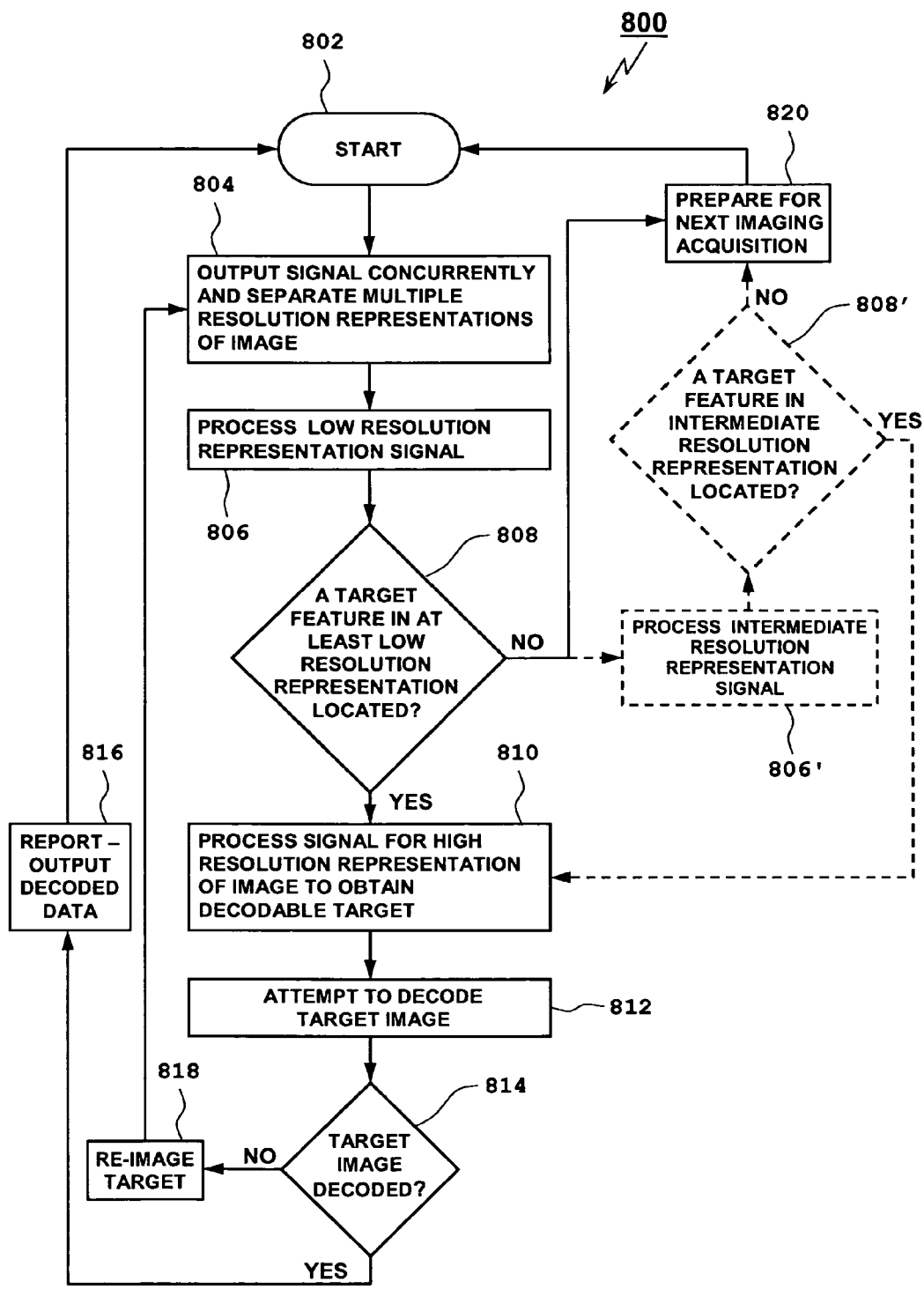
FIG. 8 is a flow chart illustrating a method of processing multiple resolution representations of an image in accordance with the present disclosure.

Referring again to FIGS. 5, 6A-6D, 7A-7B and particularly to FIG. 8, the present disclosure relates also to a method 800 for optical code reading. In particular, following the step 802 of starting the method, the method 800 includes the step of illuminating a potential target area to acquire a native image, e.g., ambient light 608a or source light 608b illuminating potential target area 602 to acquire native image 604 (see FIG. 5). The method 800 also includes the step of converting the native image 604 to a data signal, e.g., data signal 610. The data signal 610 includes potential target area data indicative of multiple resolutions of the native image, e.g., indicative of a low resolution representation of the native image 604, e.g., bins $704_1$, $704_2$, $704_3$ and $704_4$, as described above with respect to FIG. 6C, and of a high resolution representation of the native image 604, e.g., the full array 700 of pixels 702 as described above with respect to FIG. 6A. The method 800 also includes the step 804 of outputting concurrently by separating the potential target area data included within the data signal 610 into at least a first group of pixels indicative of the low resolution representation of the native image 604, e.g., first group 614a as described above with respect to FIG. 7A, and a second group of pixels indicative of the high resolution representation of the native image, e.g., second group 614b as also described above with respect to FIG. 7A.

The method 800 may further include within step 804 the step of separating the potential target area data into at least a third group of pixels indicative of an intermediate resolution representation of the native image, e.g., third group 616 as described above with respect to FIGS. 6C and 7A, wherein the intermediate resolution representation has a resolution between a resolution of the low resolution representation of the native image 604 and the resolution of the high resolution representation of the native image 604.

The method 800 may further include the step 806 of processing the first group 614a of pixels indicative of the low resolution representation of the native image 604 to locate an actual target in the potential target area 602. Upon locating an actual target 606 in the potential target area 602, as determined at decision step 808, the method 800 may further include the step 810 of processing the second group 614b of pixels indicative of the high resolution representation of the native image 604 to decode the actual target 602, as indicated by step 812.

If the actual target 606 is decoded, as determined at decision step 814, the method 800 further comprises the step of outputting the decoded data for the actual target 606 as a step of reporting 816, such as by reporting to terminal 512 (see FIG. 5), wherein the method 800 returns to the start step 801. If the actual target 606 is not decoded upon processing the second group 614b of pixels, as determined at decision step 814, the method 800 further includes the step 818 of re-imaging the potential target area 602 via the imaging engine 502' (see FIG. 5), to sequentially repeat step 804 of outputting concurrently by separating the potential target area data included within the data signal 610.

If no target is located in the potential target area 602, as determined at decision step 808, the method 800 further includes the step 820 of preparing for the next imaging acquisition by returning to the start position 802.

The method 800 may be implemented wherein the native image 604 is converted to the data signal 610 at a rate of conversion, and the method 800 further includes the step of converting the first group 614a of pixels and the second group 614b of pixels at substantially the same rate of conversion as the rate of conversion of the native image 604 to the data signal 610.

In one embodiment, the method 800 may further include the step 806' of processing the third group 616 of pixels indicative of the intermediate resolution representation of the native image 604 to locate an actual target in the potential target area 602. Upon locating an actual target, e.g., target 606, in the potential target area 602, the method 800 further includes the step 810 of processing the second group 614b of pixels indicative of the high resolution representation of the native image 604 to decode the actual target 606. If no target is located in the potential target area 602, the method 800 may further include the step 820 of preparing for the next imaging acquisition.

Thus, an optical code reading system, and corresponding imaging engine, processors, and methods are disclosed wherein multiple representations of the native image 604 of a potential target area 602 can be transmitted concurrently from the imaging sensor 520 of the imaging device 500'. Data signal 610 includes potential target area data indicative of the multiple resolutions of the native image 604, e.g., a low resolution representation of the native image 604 and a high resolution representation of the native image 604. As also illustrated above, the data signal 610 may also include potential target area data indicative of an intermediate resolution representation of the native image 604. At least one processor, e.g., application specific signal processor (ASSP) 612, includes means for, e.g., at least one of firmware, software and hardware adapted for, receiving the data signal 610 and for separating the potential target area data included within the data signal 610 into at least a first group of pixels 614a indicative of the low resolution representation of the native image 604 and a second group of pixels 614b indicative of the high resolution representation of the native image 604.

The described embodiments of the present disclosure are intended to be illustrative rather than restrictive, and are not intended to represent every embodiment of the present disclosure. Various modifications and variations can be made without departing from the spirit or scope of the disclosure as set forth in the following claims both literally and in equivalents recognized in law.

What is claimed is:
1. An optical code reading system comprising:
an imaging engine having:
an illuminating assembly for illuminating a potential target area;
an imaging assembly including:
an imaging sensor for acquiring a native image of a potential target area; and circuitry for converting the native image of a potential target area to a data signal and outputting the data signal, wherein the data signal includes potential target area data indicative of a low resolution representation of the native image and a high resolution representation of the native image; and at least one processor comprising means for receiving the data signal and separating the potential target area data included within the data signal into at least a first group of pixels indicative of the low resolution representation of the native image and a second group of pixels indicative of the high resolution representation of the native image; and wherein the at least one processor includes:

a first processor comprising means for outputting the first group of pixels indicative of the low resolution representation of the native image and the second group of pixels indicative of the high resolution representation of the native image, and a second processor comprising means for receiving from the first processor the first group of pixels indicative of the low resolution representation of the native image and the second group of pixels indicative of the high resolution representation of the native image output by the first processor; and wherein the first processor is an application specific integrated circuit (ASIC) and the second processor is a general purpose programmable circuit.

2. The system according to claim 1, wherein the at least one processor comprises means for separating the potential target area data into at least a third group of pixels indicative of an intermediate resolution representation of the native image, wherein the intermediate resolution representation has a resolution between a resolution of the low resolution representation and a resolution of the high resolution representation.

3. The system according to claim 1, wherein the second processor comprises means for processing the first group of pixels to locate an actual target in the potential target area.

4. The system according to claim 3, wherein the second processor comprises means for outputting decoded data for the actual target if the second processor decodes the actual target based on the processing of the second group of pixels.

5. The system according to claim 3, wherein the second processor comprises means for preparing the imaging assembly for the next imaging acquisition if no target is located in the potential target area.

6. The system according to claim 3, wherein the second processor comprises means for directing the imaging assembly to re-image the potential target area if the actual target is not decoded upon processing the second group of pixels.

7. The system according to claim 1, wherein the second processor comprises means for processing the second group of pixels upon locating an actual target in the potential target area based upon the processing of the first group of pixels.

8. The system according to claim 1, wherein the imaging engine is capable of converting the native image to the data signal at a rate of conversion, and wherein the at least one processor comprises means for receiving the data signal and separating the potential target area data included within the data signal into at least a first group of pixels indicative of the low resolution representation of the native image and a second group of pixels indicative of the high resolution representation of the native image at substantially the same rate of conversion as the rate of conversion of the native image to the data signal.

9. The system according to claim 1, wherein at least one of the low resolution representation of the native image and the high resolution representation of the native image is composed of at least one of (a) statistical computations; (b) digital filter outputs; and (c) data derived from pixel values of the native image.

10. The system according to claim 1, wherein the at least one processor comprises a single processor.

11. The system according to claim 10, wherein the single processor is one of an application specific integrated circuit (ASIC) and a general purpose programmable circuit.

12. The system according to claim 10, wherein the single processor comprises means for processing the at least first group of pixels to locate an actual target in the potential target area.

13. The system according to claim 12, wherein the single processor comprises means for processing the second group of pixels upon locating an actual target in the potential target area based upon the processing of the at least first group of pixels.

14. The system according to claim 13, wherein the single processor comprises means for outputting decoded data for the actual target if the single processor decodes the actual target based on the processing of the second group of pixels.

15. The system according to claim 13, wherein the single processor comprises means for directing the imaging sensor to re-image the potential target area if the actual target is not decoded upon processing the second group of pixels.

16. The system according to claim 12, wherein the single processor comprises means for preparing the imaging assembly for the next imaging acquisition if no target is located in the potential target area.

17. The system according to claim 1, wherein the imaging sensor is a variable resolution imaging sensor capable of outputting images having at least two different resolutions.

18. A method for optical code reading comprising the steps of:

illuminating a potential target area to acquire a native image with an imaging sensor;

converting the native image to a data signal with an application specific integrated circuit (ASIC) that receives the native image from the imaging sensor, wherein the data signal includes potential target area data indicative of at least a low resolution representation of the native image and of a high resolution representation of the native image;

separating the potential target area data included within the data signal into at least a first group of pixels indicative of the low resolution representation of the native image and a second group of pixels indicative of the high resolution representation of the native image; and outputting in parallel from the ASIC to a general purpose programmable circuit at least first group of pixels and the second group of pixels concurrently at substantially the same rate of conversion as a rate of conversion of the native image to the data signal.

19. The method according to claim 18, further comprising the step of separating the potential target area data into at least a third group of pixels indicative of an intermediate resolution representation of the native image, wherein the intermediate resolution representation has a resolution between a resolution of the low resolution representation of the native image and the resolution of the high resolution representation of the native image.

20. The method according to claim 19, further comprising the step of processing the third group of pixels indicative of the intermediate resolution representation of the native image to locate an actual target in the potential target area.

21. The method according to claim 20, wherein, upon locating an actual target in the potential target area, the method further comprises the step of processing the second group of pixels indicative of the high resolution representation of the native image to decode the actual target.

22. The method according to claim 20, wherein, if no target is located in the potential target area, the method further comprises the step of preparing for the next imaging acquisition.

23. The method according to claim 18, further comprising the step of processing the at least first group of pixels indicative of the low resolution representation of the native image to locate an actual target in the potential target area.

24. The method according to claim 23, wherein, upon locating an actual target in the potential target area, the method further comprises the step of processing the second group of pixels indicative of the high resolution representation of the native image to decode the actual target.

25. The method according to claim 24, wherein, if the actual target is decoded, the method further comprises the step of outputting the decoded data for the actual target.

26. The method according to claim 24, wherein, if the actual target is not decoded upon processing the second group of pixels, the method further comprises the step of re-imaging the potential target area.

27. The method according to claim 23, wherein, if no target is located in the potential target area, the method further comprises the step of preparing for the next imaging acquisition.

* * * * *